(12) United States Patent
Hunter et al.

(10) Patent No.: US 9,027,895 B2
(45) Date of Patent: May 12, 2015

(54) PORTABLE SUPPORT HAVING EXTENDABLE ROD

(75) Inventors: Christopher Hunter, Redding, CA (US); James M. Copeland, Redding, CA (US); Christopher James McNeill, Redding, CA (US)

(73) Assignee: SECO Manufacturing Company, Inc., Sunnyvale, CA (US)

( * ) Notice: Subject to any disclaimer, the term of this patent is extended or adjusted under 35 U.S.C. 154(b) by 335 days.

(21) Appl. No.: 13/446,478

(22) Filed: Apr. 13, 2012

(65) Prior Publication Data

US 2013/0270405 A1 Oct. 17, 2013

(51) Int. Cl.
| | |
|---|---|
| *F16M 13/00* | (2006.01) |
| *F16B 9/00* | (2006.01) |
| *F16M 11/04* | (2006.01) |
| *F16M 11/18* | (2006.01) |
| *F16M 11/28* | (2006.01) |
| *F16M 11/36* | (2006.01) |
| *G01C 15/06* | (2006.01) |

(52) U.S. Cl.
CPC .............. *F16M 11/18* (2013.01); *F16M 11/046* (2013.01); *F16M 11/28* (2013.01); *F16M 11/36* (2013.01); *G01C 15/06* (2013.01)

(58) Field of Classification Search
CPC ....... F16M 11/28; F16M 11/26; F16M 11/32; A47B 9/06; A47C 3/26; A47C 3/265; F16B 7/04; F16B 7/0406; F16B 7/0413; F16B 7/042
USPC ......... 248/292.14, 125.8, 166, 434, 435, 168, 248/169, 170, 171, 439, 151, 159, 150, 431, 248/178.1, 183.1, 186.1, 176.3, 188, 248/292.12, 177.1; 403/192, 289, 290, 333, 403/334, 298, 292–297; 396/19
See application file for complete search history.

(56) References Cited

U.S. PATENT DOCUMENTS

| | | | | |
|---|---|---|---|---|
| 1,573,496 | A | * | 2/1926 | Jansson et al. ................ 248/171 |
| 2,283,422 | A | * | 5/1942 | Chamberlain, Jr. ......... 248/186.1 |
| 2,453,817 | A | * | 11/1948 | Shalkhauser ................. 248/413 |
| 2,508,122 | A | * | 5/1950 | Mooney ........................ 248/404 |
| 2,883,875 | A | * | 4/1959 | Davidson ..................... 74/424.6 |
| 3,208,711 | A | * | 9/1965 | Pagliuso ....................... 248/422 |
| 3,266,827 | A | * | 8/1966 | Whicker ......................... 403/24 |
| 4,088,291 | A | * | 5/1978 | Delaplaine et al. ......... 248/186.1 |
| 5,058,446 | A | * | 10/1991 | Guey ........................... 74/89.17 |
| 5,080,313 | A | * | 1/1992 | Byrum et al. ................. 248/343 |
| 5,308,029 | A | * | 5/1994 | Bingham ...................... 248/159 |
| 6,631,877 | B1 | | 10/2003 | Crain et al. |
| 6,688,566 | B1 | | 2/2004 | Crain et al. |
| 6,714,729 | B1 | * | 3/2004 | Sugiura et al. ................. 396/19 |
| 6,874,971 | B2 | * | 4/2005 | Albaugh ....................... 403/297 |

(Continued)

*Primary Examiner* — Christopher Garft
(74) *Attorney, Agent, or Firm* — Senniger Powers LLP

(57) ABSTRACT

A portable support for supporting equipment above a surface having an opening to a subsurface space. The support includes a head, an elevator on the head, and legs connected to the head for supporting the head above the surface. Each of the legs has a foot for engaging the surface when supporting the head above the surface. The support also includes an elongate rod vertically mounted on the elevator for movement between a raised position, in which an upper end of the rod extends above the head, and a lowered position, in which a lower end of the rod extends below the feet of the legs to extend into the subsurface space. The support includes an instrument platform positionable on the lower end of the rod when in the lowered position to support the equipment in the subsurface space when the rod is in the lowered position.

14 Claims, 12 Drawing Sheets

(56) References Cited

U.S. PATENT DOCUMENTS

| | | |
|---|---|---|
| 7,156,114 B2 * | 1/2007 | Lo .................................. 135/21 |
| 7,516,590 B2 * | 4/2009 | Brinkmann ................ 52/651.01 |
| 8,371,768 B1 * | 2/2013 | Wu ................................ 403/294 |
| 8,739,493 B2 * | 6/2014 | Carnes ........................ 52/655.1 |
| 2004/0047624 A1 * | 3/2004 | Sugiura et al. ................. 396/427 |
| 2005/0127258 A1 * | 6/2005 | Lapointe et al. ........... 248/218.4 |

* cited by examiner

PORTABLE SUPPORT HAVING EXTENDABLE ROD

BACKGROUND

The present invention generally relates to portable supports, and more particularly, to a portable support having an extendable rod for supporting surveying equipment and the like.

Surveying equipment is commonly supported by tripod having telescoping legs that can be retracted for transport and storage. Frequently, surfaces are surveyed far from roads and sidewalks where equipment must be carried over broken terrain for considerable distances to reach the site. As a result, it is imperative that tripods be light weight and collapsible for easy transport. The ability to collapse, however, can be a source of imprecision in supporting surveying equipment because tolerances of the collapsible features may be or become loose over time, allowing the tripod to wobble. On occasion, surveying measurements require that the equipment be a substantial distance above the surface on which feet of the tripod rest. Most conventional tripods do not permit the surveying equipment to be raised substantial distances without wobbling and adversely affecting precision. Further, conventional tripods do not permit the surveying equipment to be supported in spaces below the tripod feet. Positioning the surveying equipment below the tripod feet is required to measure subterranean spaces and the like. Thus, there is a need for portable supports that remain stable when supporting equipment substantial distances above the surface on which the support rests or when supporting equipment below the surface.

SUMMARY

In one aspect, the present invention includes a portable support for supporting equipment above a surface having an opening extending to a subsurface space. The support comprises a head, an elevator mounted on the head, and legs connected to the head for supporting the head above the surface over the opening. Each leg has a foot for engaging the surface when supporting the head above the surface. The support also includes an elongate rod vertically mounted on the elevator for vertical movement between a raised position, in which an upper end of the rod extends above the head, and a lowered position, in which a lower end of the rod extends below the feet of the legs to extend through the opening and into the subsurface space. Further, the support includes an instrument platform positionable on the lower end of the rod when in the lowered position to support the equipment in the subsurface space when the rod is in the lowered position.

In another aspect, the present invention includes a portable support for supporting equipment above a surface. The support includes a head, legs connected to the head for supporting the head above the surface, and an elongate rod mounted on the head and longitudinally moveable relative to the head between a retracted position and an extended position. In addition, the portable support comprises an instrument platform at an end of the rod remote from the head for supporting the equipment when the rod is in the extended position.

In still another aspect, the present invention includes a portable support for supporting equipment. The support comprises a head and legs connected to the head for supporting the head above the surface. Each leg includes a foot for engaging the surface when supporting the head above the surface. Further, the support includes a plurality of elongate rods vertically mounted on the head in end to end relation. The support also comprises a connector for connecting adjacent rods. The support has an instrument platform positionable on one of the rods to support the equipment.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
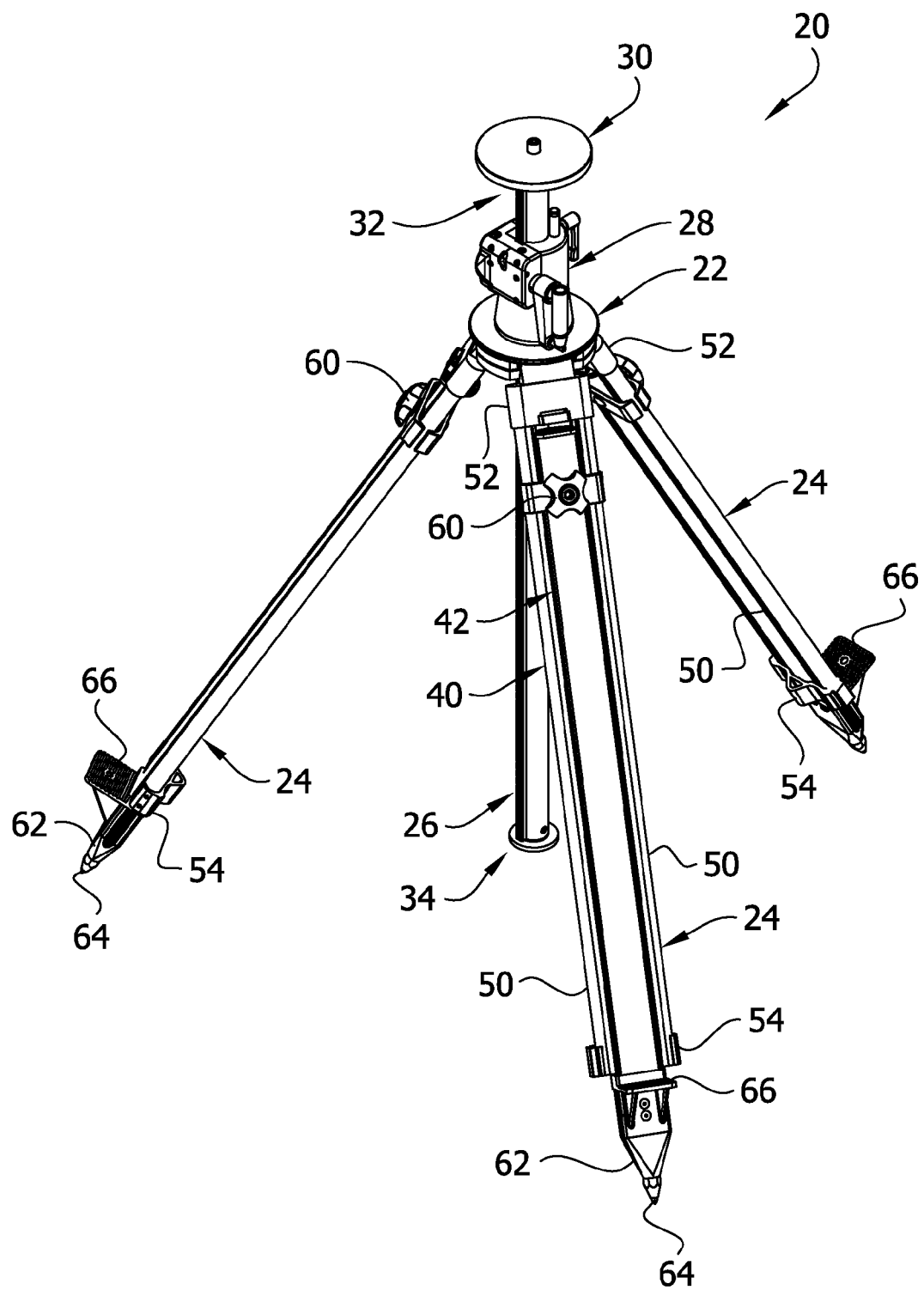
FIG. 1 is a perspective of a support of one embodiment of the present invention.

Referring to FIG. 1, a support incorporating an embodiment of the present invention is designated in its entirety by the reference number 20. The support 20 generally includes a head 22, telescoping legs 24 pivotably connected to the head, a rod 26 operatively connected to the head by an elevator 28 mounted on the head for selective up and down movement, and an instrument platform 30 selectively connectable to upper or lower ends 32, 34, respectively, of the rod for holding equipment. In one embodiment, the support 20 comprises a tripod having three legs 24 pivotably connected to the head 22. Those skilled in the art, however, will appreciate the support 20 may have a different number of legs 24 without departing from the scope of the present invention. The support 20 is particularly suited for holding surveying equipment in a stable manner, but may be used to support other equipment. The legs 24 are pivotably connected to the head 22 for movement between a deployed position as shown in FIG. 1, in which the legs are spread apart for use, and a collapsed position (not shown), in which the legs are closer together for transport or storage.

Figure 2:
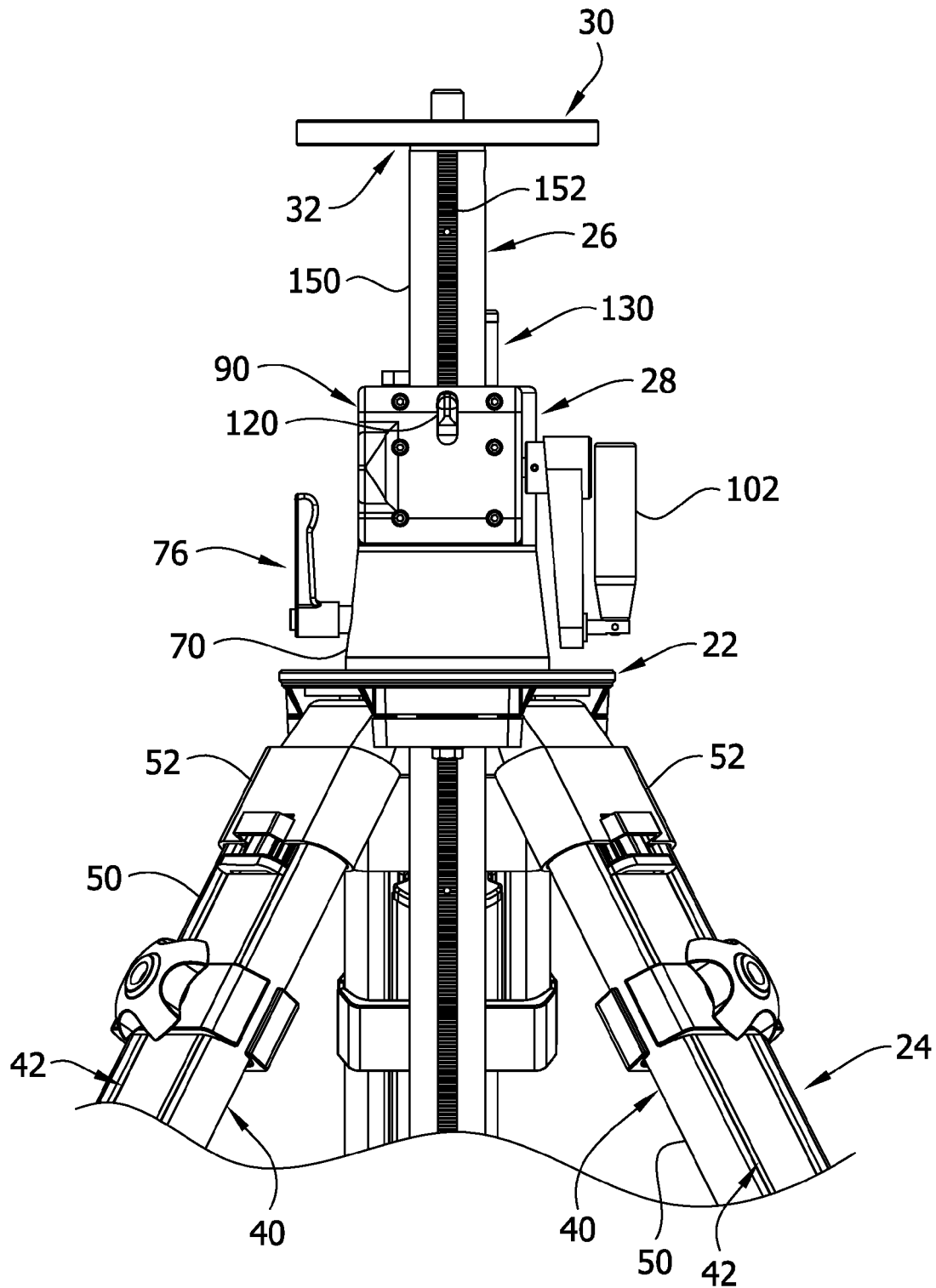
FIG. 2 is a detail of a head of the support.

As further illustrated in FIGS. 1 and 2, each leg 24 has a primary leg element, generally designated 40, that is pivotally connected to the head 22 and a secondary leg element, generally designated 42, telescopically attached to the primary leg element. Each primary leg element 40 includes a pair of spaced tubular elements 50 joined at their upper ends by a hinge 52 and at their lower ends by a spacer 54 (FIG. 1). The secondary leg elements 42 are slidably received between the tubular elements 50 of the primary leg element 40. A clamp 60 is provided at an upper end of each secondary leg element 42 for selectively clamping the secondary leg element in position on the corresponding primary leg element 40. As shown in FIG. 1, the secondary leg elements 42 include feet 62 at their lower ends to engage the surface on which the feet rest. The feet 62 have points 64 for penetrating the surface to secure the support 20 in place. A step 66 is provided on each foot 62 for applying a downward load on the foot for penetrating the surface. As the legs 24 are conventional, they will not be described in further detail. Examples of suitable conventional legs are described in U.S. Pat. Nos. 6,631,877 and 6,688,566, which are incorporated by reference.

Figure 3:
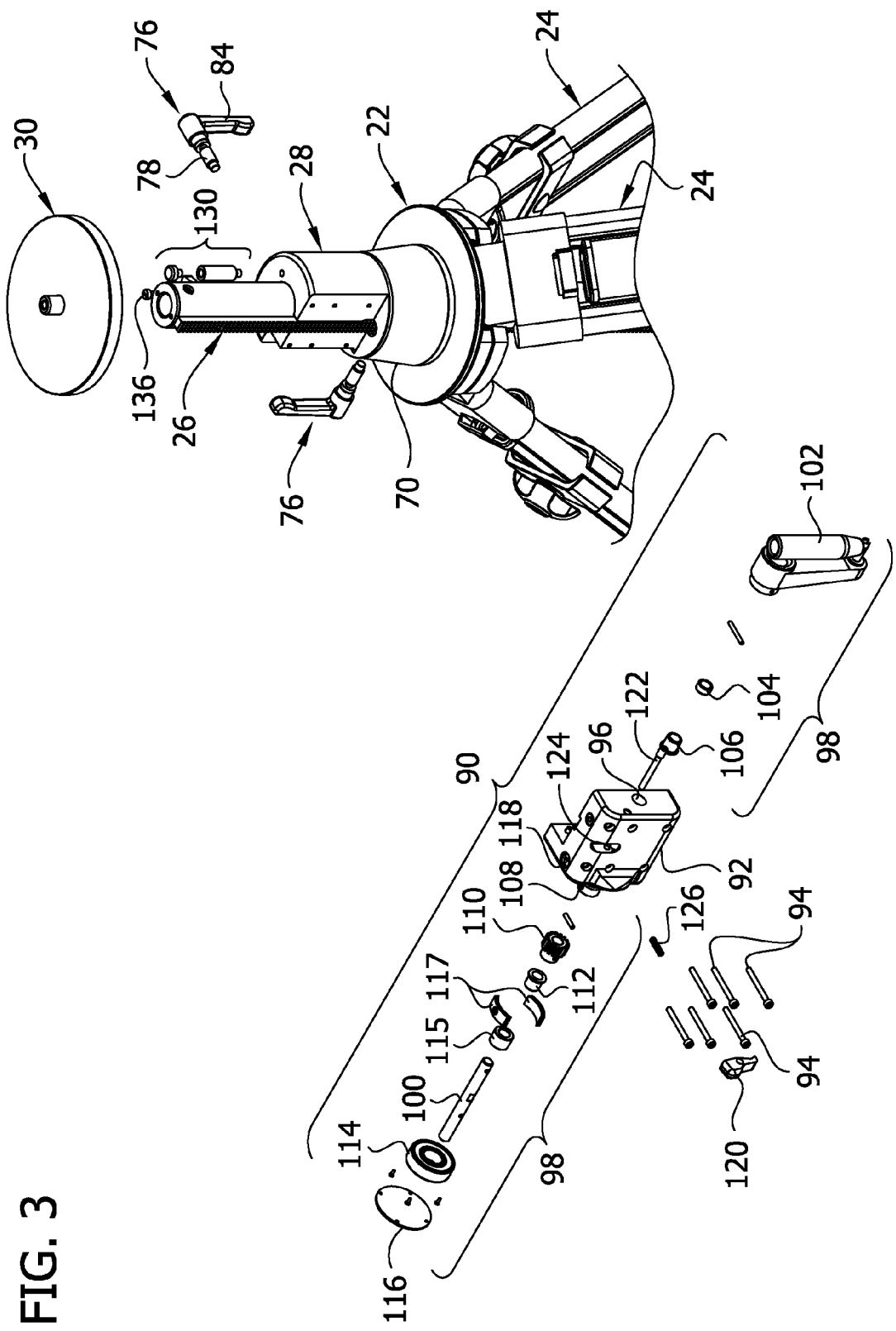
FIG. 3 is a perspective showing the head components separated.
Figure 4:
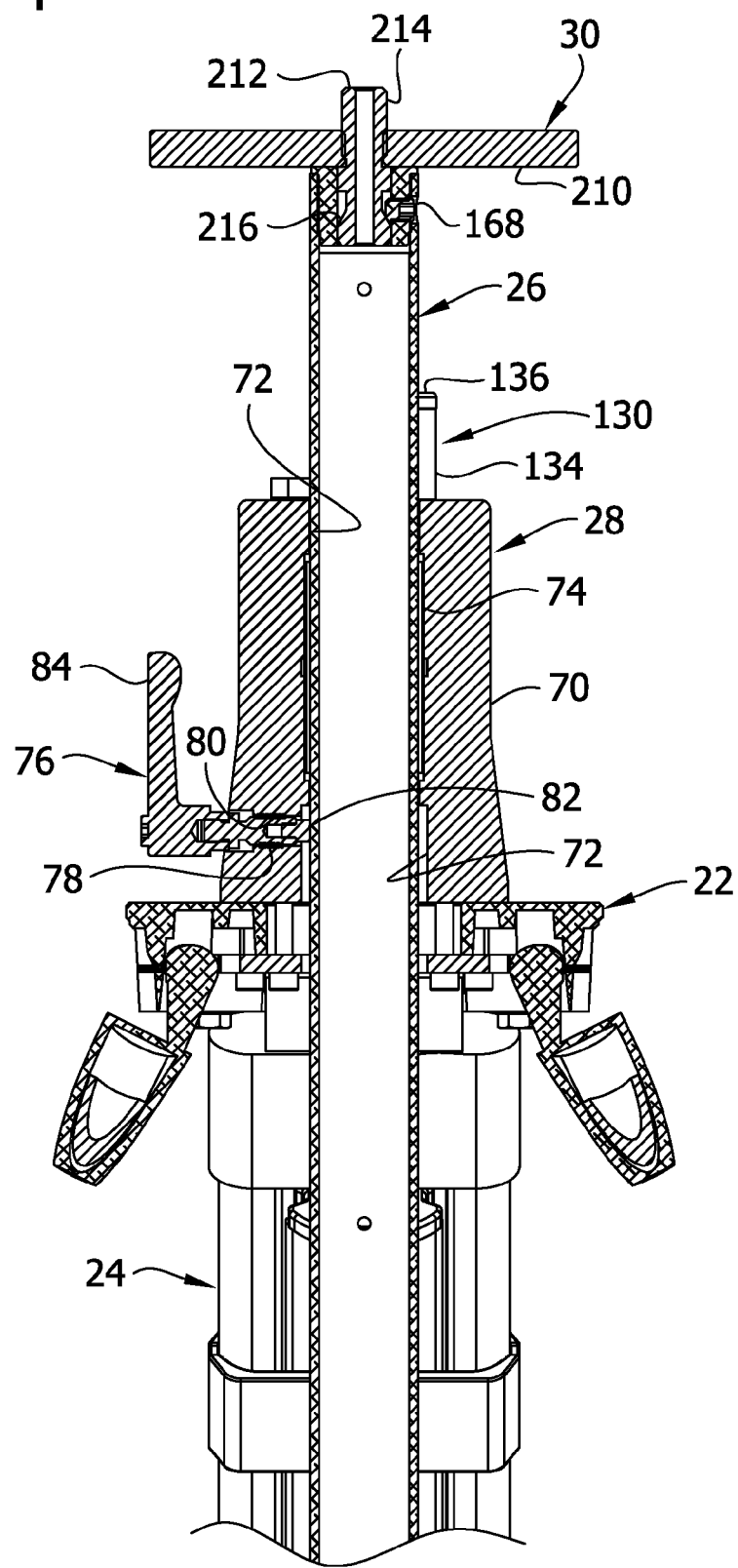
FIG. 4 is a vertical cross section showing a screw lock and instrument platform of the support.
Figure 5:
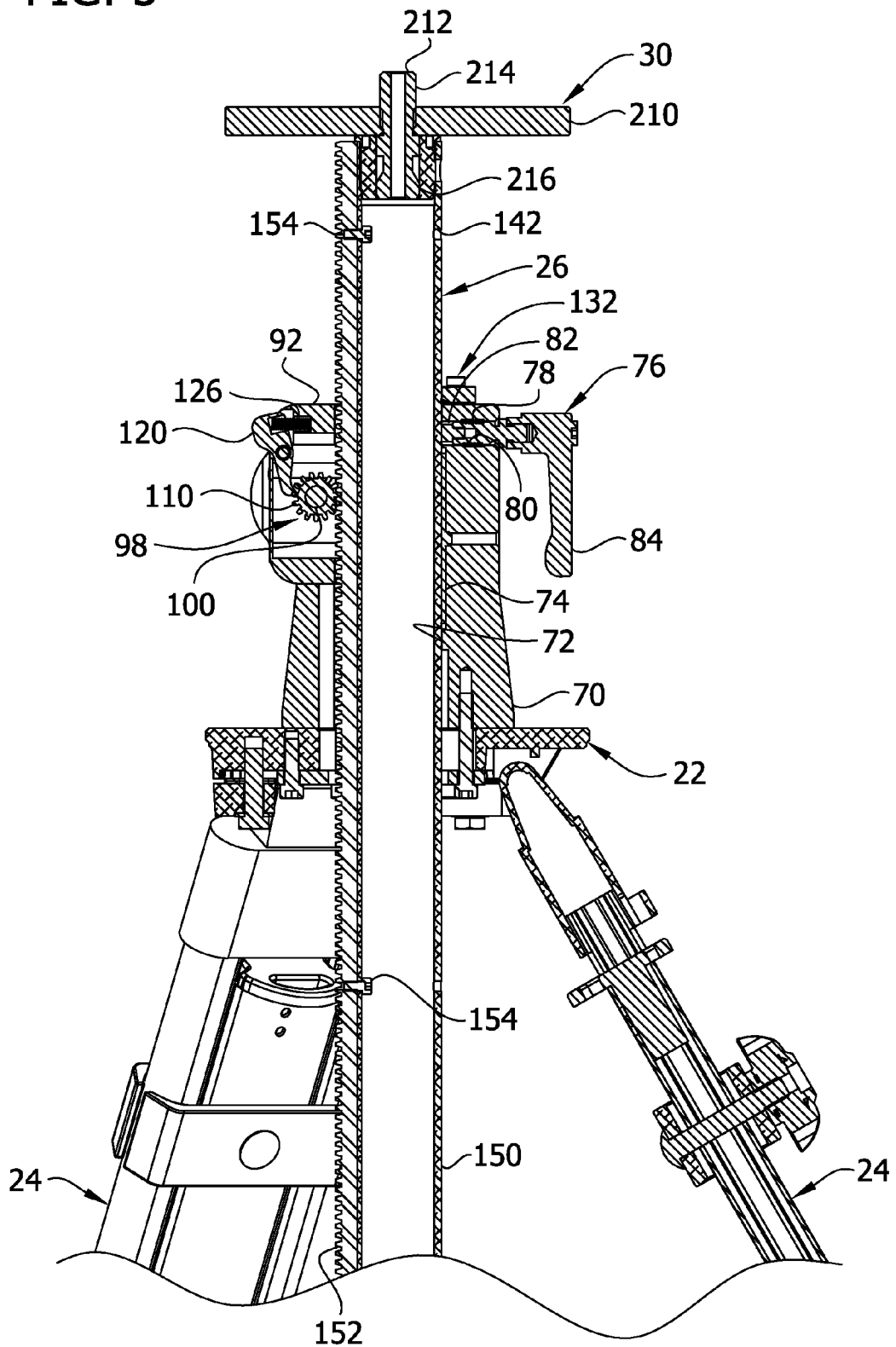
FIG. 5 is a vertical cross section showing a rack and pinion of the support.

As illustrated in FIGS. 3-5, the elevator 28 includes a generally tubular body 70 having a central opening 72 (FIGS. 4 and 5) sized for receiving the rod 26. The opening 72 may include a tubular bushing 74 for slidably engaging the rod 26. Screw clamps, generally designated 76, are provided at two circumferential positions around the body 70. Each screw clamp includes a threaded shaft 78 that is a threadably received in a corresponding threaded hole 80 in the body 70. A shoe 82 is provided at the inboard end of each shaft 78 for engaging the rod 26, and a handle 84 is provided at the outboard end of each shaft for turning the shaft to selectively engage and disengage the corresponding shoe from the rod. Although the screw clamps 76 may be otherwise circumferentially spaced, in an illustrated embodiment the screw clamps are spaced about ninety degrees from each other to provide a rigid connection between the elevator 28 and the rod 26 when the screw clamps are engaging the rod.

Returning to FIGS. 2 and 3, the elevator 28 further includes a crank assembly, generally designated 90, that may be used to raise and lower the rod 26. As shown in FIG. 3, the crank assembly 90 includes a housing 92 that is mounted on the tubular body 70 such as by screw fasteners 94. The housing 92 includes openings 96 on opposite sides for receiving a shaft assembly 98. The shaft assembly 98 includes an axle 100 having a crank 102 (broadly an actuator) pinned to one end. Adjacent the crank 102 is a spacer 104 and a bushing 106 that supports the corresponding end of the axle 100 in the housing opening 96. Adjacent the bushing 106 is another spacer 108 that separates the bushing from a pinion 110 that is pinned to the axle 100. Another bushing 112 supports an end of the axle 100 opposite the bushing 106 in the corresponding housing opening 96. A one-way bearing 114 is mounted on a collar 115 provided on the axle 100 opposite the crank 102. A cover 116 closes the housing 92 to protect the bearing from dust and debris. As will be appreciated by those skilled in the art, the one-way bearing 114 only permits rotation in one direction. The bearing 114 is mounted between opposing shoes 117 in the housing 92. Spacing between the shoes 117 may be adjusted by turning an adjustment screw 118 provided on the housing 92. This arrangement permits the crank 102 to turn freely in the direction in which the bearing 114 turns. The shoes 117 may be adjusted by turning the screw 118 to permit the bearing 114 to turn between the shoes. Thus, the crank 102 can be turned freely to rotate the axle 100 and the pinion 110 to raise the rod 26, but greater torque is required to turn the crank 102 in the opposite direction. As will be appreciated by those skilled in the art, the shoes 117 can be adjusted to prevent or slow the shaft 100 and pinion 110 from turning under the weight of the rods 26 and equipment supported by the rods. Accordingly, when the shoes 117 can be adjusted to prevent the rods 26 and associated equipment from falling freely when the crank 102 is released. In addition, the crank 102 in the illustrated embodiment is a conventional folding crank for transport and storage.

As illustrated in FIGS. 3 and 5, a pawl 120 is pivotally mounted on a pin 122 in the housing 92. The pawl 120 extends through an opening 124 in the housing 92 where it can be accessed by an operator to manually disengage the pawl from the pinion 110, allowing the pinion to rotate freely for raising and lowering the rod as will be explained below. A spring 126 is mounted between the pawl 120 and the housing 92 to bias the pawl toward engagement with the pinion 110.

Figure 6:
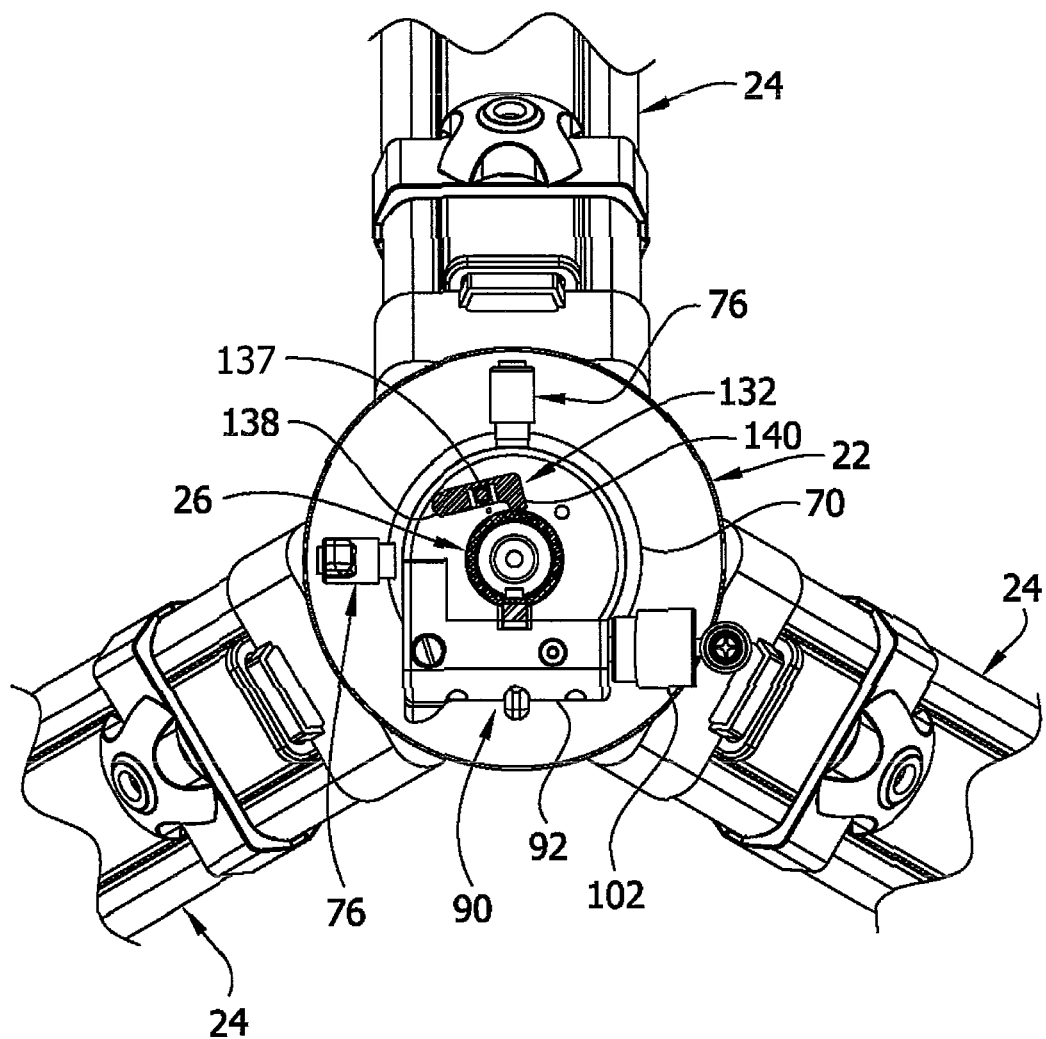
FIG. 6 is a horizontal cross section showing a latch of the support.

FIGS. 3-6 show a stop, generally designated 130, and a latch, generally designated 132, mounted on top of the body 70 to prevent the rod 26 from falling through the central opening 72 when the pawl 120 is disengaged from the pinion 110. As shown in FIG. 4, the stop 130 includes a post 134 having a bumper 136 on its upper end for contacting the instrument platform 30. Further, as shown in FIG. 6, the latch 132 is pivotally connected to the body 70 by a screw fastener 137. The latch 132 includes a lever 138 having a finger 140 positioned on opposite sides of the fastener 137. The latch 132 is spring loaded by a rotary coil spring (not shown) mounted under the latch 132 that biases the finger 140 against the rod. When the rod 26 is lowered so the instrument platform 30 is near the stop 130, the finger 140 engages an opening 142 (FIG. 5) in the rod 26 to hold the rod in position relative to the elevator. Not only does the latch 132 prevent the rod 26 from falling through the opening 72 when the pawl 120 is disengaged from the pinion 110, but it also can be used to lock the rod in position relative to the tripod during transport.

Figure 7:
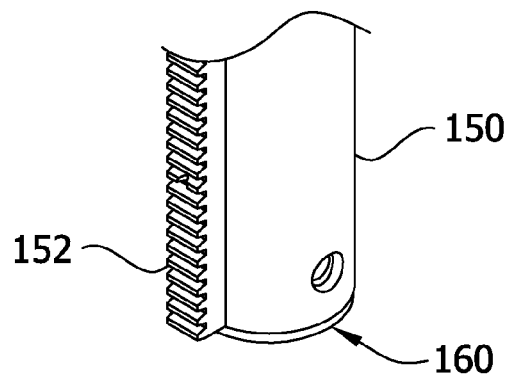
FIG. 7 is a perspective showing rods and a connector separated.
Figure 7:
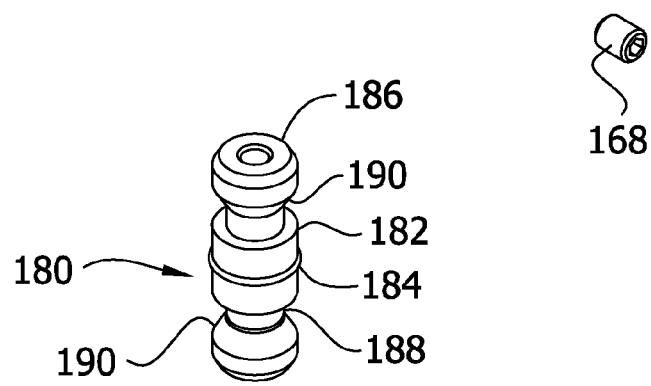
Figure 7:
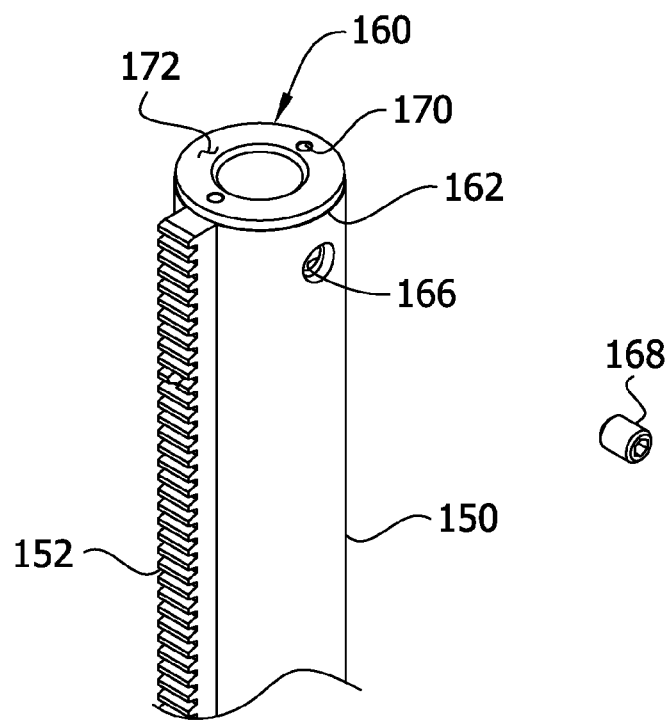
Figure 8:
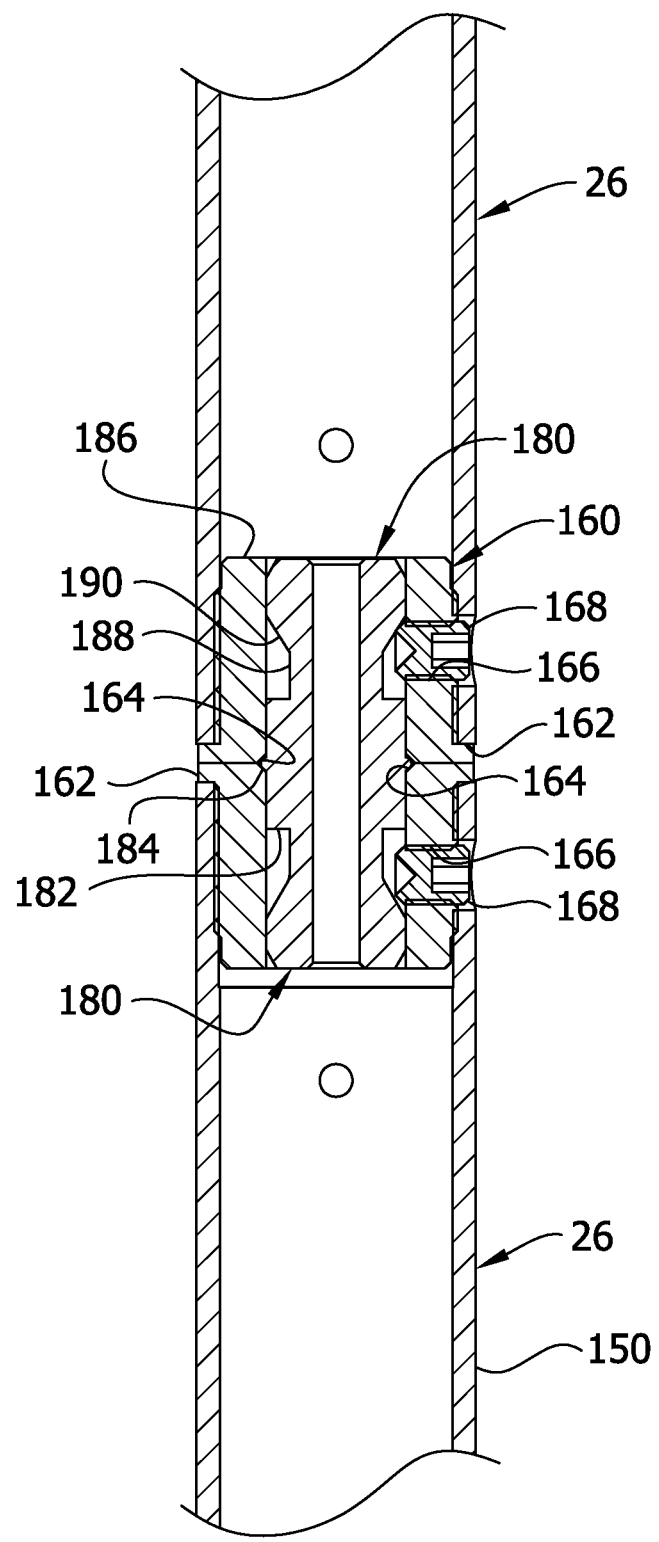
FIG. 8 is a vertical cross section of the rods and connector.
Figure 9:
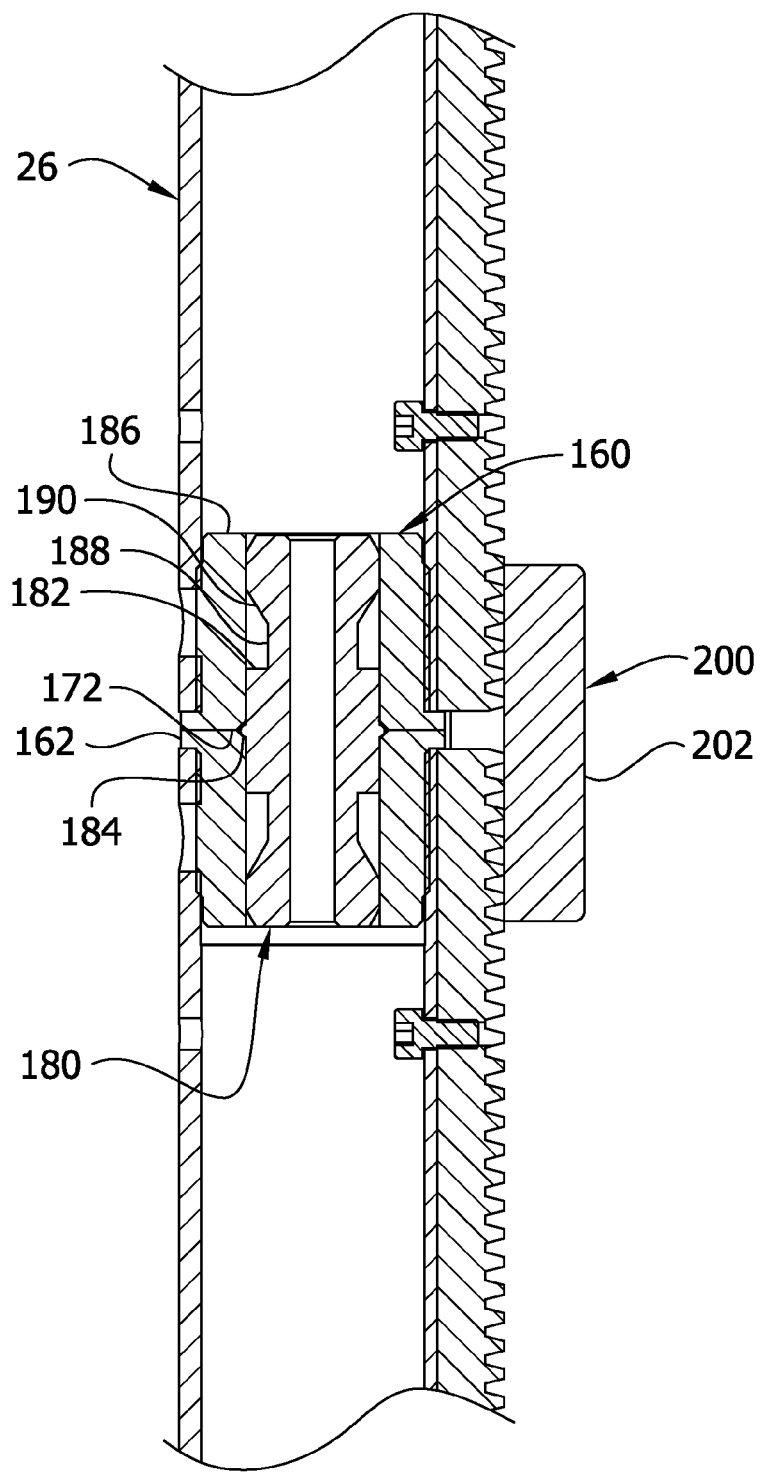
FIG. 9 is a vertical cross section showing a gage used when connecting two rods

Returning to FIG. 5, the rod 26 comprises a tube 150 having a longitudinal rack 152 fastened to its side with screw fasteners 154. As will be appreciated by those skilled in the art, the pinion 110 of the crank assembly 90 converts the rotational motion of the pinion into linear longitudinal motion of the rod 26 to raise the rod. As shown in FIG. 7, an end socket, generally designated 160, is attached to each end of the tube 150. Although the end socket 160 may be attached to the tube 150 by other means (e.g., brazing, welding, or adhesively bonding), in one embodiment the socket 160 is threaded into complementary threads inside the tube 150 as shown in FIGS. 8 and 9. As also shown in FIGS. 8 and 9, the socket 160 includes a flange 162 that contacts the tube 150 to set a longitudinal position of the socket relative to the tube. The socket 160 includes a chamfer 164 at an inside edge of the flange 162 and a threaded opening 166 for receiving a set screw 168 (or more broadly a fastener). As illustrated in FIG. 7, the flanges 162 include end faces 172.

In addition, a shaped pin, generally designated 180 in FIG. 7-9, is used to connect the rods 26 end to end. The pin 180 has a central hub 182 having a circumferential rib 184 midway between its ends. The rib 184 engages the chamfer 164 of the socket 160 to center the pin 180 in a position where the sockets meet. Further, the pin 180 has a head 186 on each end. A neck 188 separates each head 186 from the hub 182, and a conical section 190 transitions between each neck 188 and its corresponding head 186.

Figure 10:
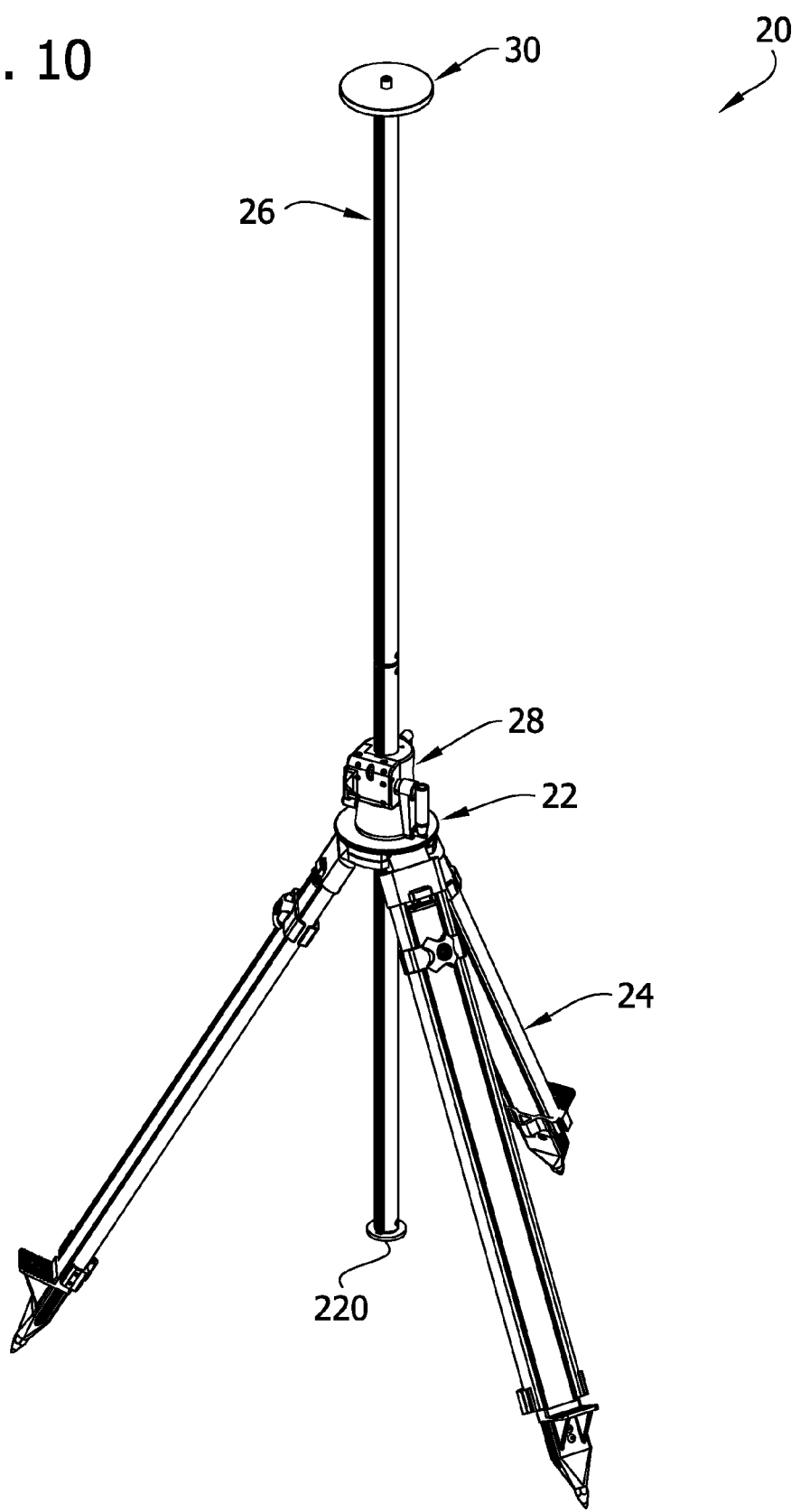
FIG. 10 is a perspective of a support having two rods in a raised position.
Figure 11:
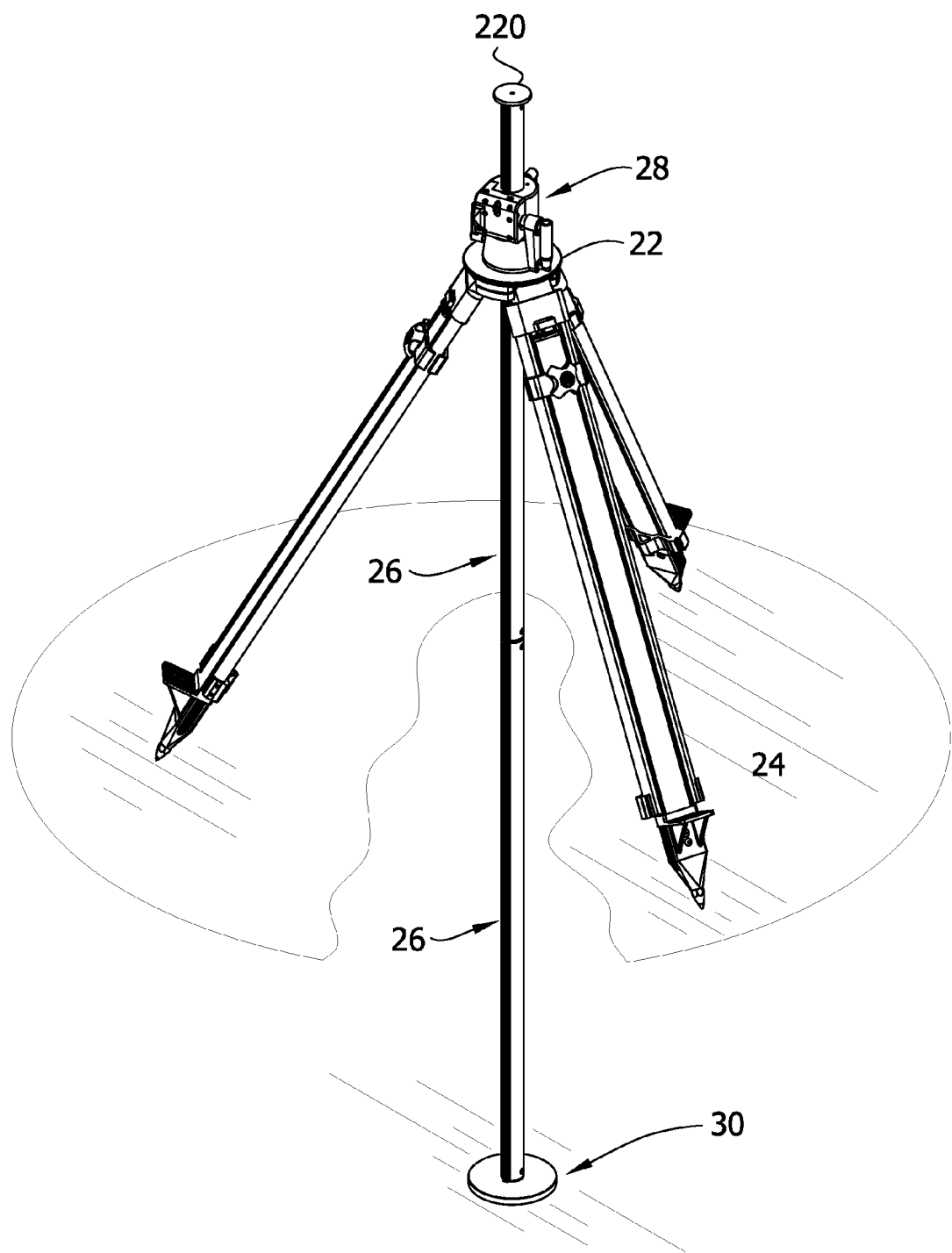
FIG. 11 is a perspective of a support having two rods in a lowered position.

To connect rods 26, a shaped pin 180 is inserted in the end socket 160 of one rod until its circumferential rib 184 seats in the chamfer 164 of the socket. Once in this position, the corresponding set screw 168 is tightened against the pin 180 to fasten the pin in place. The end socket 160 of the other rod 26 is positioned over the opposite head 186 of the pin 180, and the rods 26 are pushed together until the end faces 172 of each socket 160 contact. When the rods 26 are in this position, the set screw 168 in the second rod is tightened against the pin 180. As shown in FIG. 8, each set screw 168 engages the conical section 190 transitioning between the neck 184 and head 186 of the pin 180. This arrangement causes the set screws 168 to drawl the end sockets 160 closer, ensuring contact between the end faces 172 of the sockets 160. Further, it has been found that fastening two or three rods 26 together end to end in this manner can provide a sufficiently stable support for precision surveying equipment. Accordingly, equipment can be raised substantial distances above the support head 22 while providing stable support for the equipment as shown in FIG. 10. Further, this configuration permits equipment to be suspended from the head to a subsurface space positioned below the feet as shown in FIG. 11. Therefore, equipment can be lowered into holes in the surface on which the feet rest to measure cavities below the support. As will be appreciated by those skilled in the art, the sockets 160, pin 180, and set screw 168 may be collectively referred to as a connector or coupler.

Figure 12:
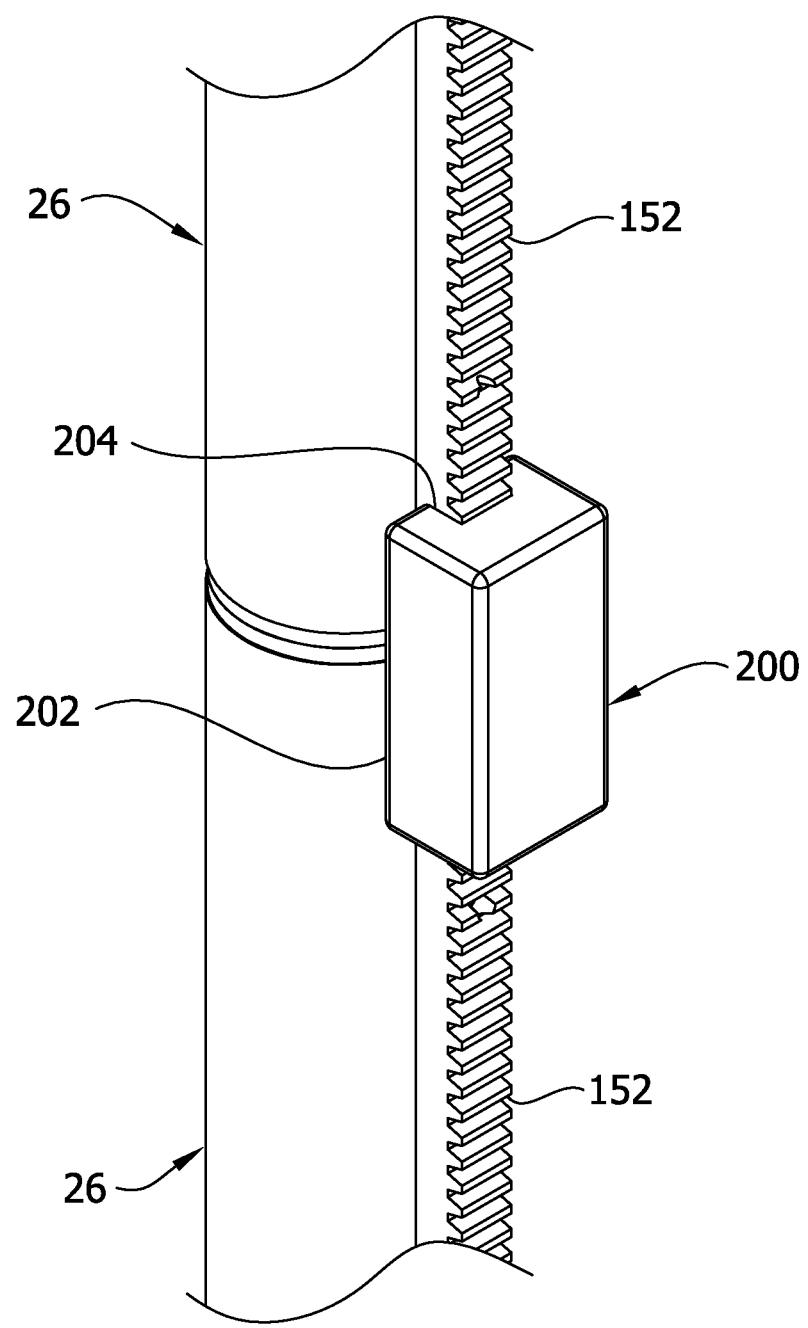
FIG. 12 is a perspective showing the gage in use.

FIGS. 9 and 12 illustrate how a fixture, generally designated 200, may be used to further ensure that the rods 26 are properly positioned with respect one another. The fixture 200 includes a block 202 having a groove 204 sized for receiving the racks 152 of the respective rods 26. The fixture 200 is used to ensure the rods 26 are circumferentially aligned so their racks 152 are coaxial. Once the rods 26 are fastened together, the fixture 200 may be removed.

The instrument platform 30 may be mounted at the upper end 32 of a rod 26 as shown in FIG. 10 or a lower end 23 of a rod as shown in FIG. 11. As illustrated in FIGS. 4 and 5, the platform 30 includes a disk 210 having an instrument connector 212 extending through a hole at its center. Although the instrument connector 212 and disk 210 may be joined in other ways without departing from the scope of the present invention, in one embodiment the connector and disk are joined by mating threads. The connector 212 includes screw threads 214 that one end for securely attaching equipment to the platform 30. On the end opposite the screw threads 214, the connector 212 has a shaped pin section 216 that is substantially identical to half of a shaped pin 180 described above. Thus, the instrument platform 30 may be connected to the rod 26 in the same manner as the rods are joined together end to end. In other words, shaped pin section 216 of the instrument platform 30 is inserted in the respective socket 160 until the disk 210 contacts the end face 172 of the socket. Once in this position, the set screw 168 on the rod 26 is tightened to hold the instrument platform in position. As will be appreciated by those skilled in the art, the instrument connector 212 may be modified to accommodate equipment have non-standard instrument screw thread diameter and/or pitch. An end cap 220 can be constructed similarly to the instrument platform 30 but having smaller diameter for attaching to an open end of the rod 26 opposite the platform for preventing dust and debris from entering the rod.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A portable support for supporting equipment above a surface having an opening extending to a subsurface space, the support comprising:

a head;

an elevator mounted on the head, the elevator including a pinion rotatably mounted on the head, and an actuator for rotating the pinion;

legs connected to the head for supporting the head above the surface over the opening, each of said legs including a foot for engaging the surface when supporting the head above the surface;

an elongate rod vertically mounted on the elevator for vertical movement between a raised position, in which an upper end of the rod extends above the head, and a lowered position, in which a lower end of the rod extends below the feet of the legs to extend through the opening and into the subsurface space, the rod including a rack extending longitudinally along the rod for selective engagement with the pinion to raise the rod in response to the actuator rotating the pinion; and an instrument platform positionable on the lower end of the rod when in the lowered position to support the equipment in the subsurface space when the rod is in the lowered position;

wherein the elevator comprises a pawl mounted on the head for selective engagement with the pinion, said pawl being moveable between a locked position, in which the pawl prevents the rod from being lowered relative to the head, and a released position, in which the pawl disengages the pinion to allow the rod to be lowered relative to the head.

2. A portable support as set forth in claim 1, wherein the actuator comprises a crank.

3. A portable support as set forth in claim 1, the elevator further comprises a clamp for engaging the rod when in the raised position and when in the lowered position to prevent movement between the rod and the elevator.

4. A portable support as set forth in claim 3, wherein the clamp is a first clamp and the elevator further comprises a second clamp circumferentially spaced from the first clamp for engaging the rod when in the raised position and when in the lowered position to prevent movement between the rod and the elevator.

5. A portable support as set forth in claim 4, wherein the first clamp and the second clamp are circumferentially spaced about ninety degrees around the rod.

6. A portable support as set forth in claim 4, wherein the first clamp and the second clamp are screw clamps.

7. A portable support as set forth in claim 1, further comprising a latch for selectively preventing movement between the rod and the elevator when the pawl is in the released position.

8. A portable support for supporting equipment above a surface having an opening extending to a subsurface space, the support comprising:

a head;

an elevator mounted on the head, the elevator including a pinion rotatably mounted on the head, and an actuator for rotating the pinion;

legs connected to the head for supporting the head above the surface over the opening, each of said legs including a foot for engaging the surface when supporting the head above the surface;

an elongate rod vertically mounted on the elevator for vertical movement between a raised position, in which an upper end of the rod extends above the head, and a lowered position, in which a lower end of the rod extends below the feet of the legs to extend through the opening and into the subsurface space, the rod including a rack extending longitudinally along the rod for selective engagement with the pinion to raise the rod in response to the actuator rotating the pinion; and an instrument platform positionable on the lower end of the rod when in the lowered position to support the equipment in the subsurface space when the rod is in the lowered position;

wherein the pinion is operatively mounted on a one-way bearing adapted to rotate freely under loading in only one direction.

9. A portable support as set forth in claim 8, wherein the one-way bearing is mounted between shoes that selectively permit the bearing to rotate between the shoes in a direction opposite the direction in which the bearing rotates freely under loading.

10. A portable support for supporting equipment above a surface having an opening extending to a subsurface space, the support comprising:

a head;

an elevator mounted on the head, the elevator including a pinion rotatably mounted on the head, and an actuator for rotating the pinion;

legs connected to the head for supporting the head above the surface over the opening, each of said legs including a foot for engaging the surface when supporting the head above the surface;

a plurality of elongate rods vertically mounted on the elevator in end to end relation for vertical movement between a raised position, in which an upper end of an upper rod of said plurality of rods extends above the head, and a lowered position, in which a lower end of a lower rod of said plurality of rods extends below the feet of the legs to extend through the opening and into the subsurface space, said plurality of rods including a rack extending longitudinally along said plurality of rods for selective engagement with the pinion to raise the plurality of rods in response to the actuator rotating the pinion;

a connector for connecting adjacent rods of said plurality of rods; and an instrument platform positionable on the lower end of the lower rod of said plurality of rods when in the lowered position to support the equipment in the subsurface space when the rod is in the lowered position;

wherein the pinion is operatively mounted on a one-way bearing adapted to rotate freely under loading in only one direction.

11. A portable support as set forth in claim 10, wherein the connector comprises:

a socket mounted on adjacent ends of the plurality of rods;

a pin sized for receipt in the sockets mounted at the adjacent ends of the plurality of rods; and a fastener joining the pin to adjacent sockets.

12. A portable support as set forth in claim 11, wherein:

the pin has a circumferential rib and opposing conical surfaces facing each other on opposite sides of the circumferential rib; and the fastener engages the opposing conical surfaces to drawl the corresponding sockets closer.

13. A portable support as set forth in claim 12, wherein the fastener comprises a screw fastener threadably connected to each socket for selectively engaging the opposing conical surfaces of the pin.

14. A portable support as set forth in claim 11 in combination with a fixture mountable over features on adjacent rods to ensure proper alignment of the rods.

* * * * *